(12) United States Patent
Fujii (10) Patent No.: US 11,274,063 B2
(45) Date of Patent: Mar. 15, 2022

(54) GLASS PLATE WITH ANTIFOULING LAYER

(71) Applicant: AGC Inc., Chiyoda-ku (JP)

(72) Inventor: Kensuke Fujii, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 1061 days.

(21) Appl. No.: 15/889,612

(22) Filed: Feb. 6, 2018

(65) Prior Publication Data

US 2018/0162771 A1   Jun. 14, 2018

Related U.S. Application Data

(63) Continuation of application No. PCT/JP2016/072555, filed on Aug. 1, 2016.

(30) Foreign Application Priority Data

Aug. 10, 2015  (JP) .............................. JP2015-158418

(51) Int. Cl.
*C03C 17/42* (2006.01)
*C03C 3/085* (2006.01)
(Continued)

(52) U.S. Cl.
CPC ............... *C03C 17/42* (2013.01); *B32B 7/12* (2013.01); *C03C 3/085* (2013.01); *C03C 15/00* (2013.01);
(Continued)

(58) Field of Classification Search
CPC ... C03C 17/42; C03C 3/085; C03C 2217/734; C03C 2217/732; C03C 2218/365; C03C 2218/34; C03C 15/00; C03C 21/002; C03C 2217/213; C03C 2217/76; C03C 2218/119; C03C 2218/154; G02B 1/18; B32B 7/12

See application file for complete search history.

(56) References Cited

U.S. PATENT DOCUMENTS 6,379,776 B1   4/2002 Tada et al.
2003/0139620 A1*  7/2003 Yamaguchi ............. G02B 1/111
556/445
(Continued)

FOREIGN PATENT DOCUMENTS

CN   103619773 A   3/2014
CN   103974919     8/2014
(Continued)

OTHER PUBLICATIONS

International Search Report dated Sep. 20, 2016 in PCT/JP2016/072555, filed on Aug. 1, 2016 (with English Translation).
(Continued)

*Primary Examiner* — Nathan L Van Sell
(74) *Attorney, Agent, or Firm* — Oblon, McClelland, Maier & Neustadt, L.L.P.

(57) ABSTRACT

A glass plate with an antifouling layer, including: a glass plate having a first principal surface, a second principal surface opposite to the first principal surface, and an end face connecting the first principal surface and the second principal surface; an adhesive layer formed from the first principal surface to the end face of the glass plate; and an antifouling layer formed on the adhesive layer.

20 Claims, 3 Drawing Sheets (51) Int. Cl.
   *B32B 7/12* (2006.01)
   *G02B 1/18* (2015.01)
   *C03C 15/00* (2006.01)
   *C03C 21/00* (2006.01)

(52) U.S. Cl.
   CPC ...... *C03C 21/002* (2013.01); *C03C 2217/213* (2013.01); *C03C 2217/732* (2013.01); *C03C 2217/734* (2013.01); *C03C 2217/76* (2013.01); *C03C 2218/119* (2013.01); *C03C 2218/154* (2013.01); *C03C 2218/34* (2013.01); *C03C 2218/365* (2013.01); *G02B 1/18* (2015.01)

(56) References Cited

U.S. PATENT DOCUMENTS

| | | |
|---|---|---|
| 2010/0200061 A1 | 8/2010 | Melchior |
| 2014/0049827 A1 | 2/2014 | Fujii et al. |
| 2014/0205801 A1* | 7/2014 | Iwata .................... B29C 59/022 428/141 |
| 2016/0152006 A1* | 6/2016 | Boek ...................... C03B 17/02 428/34.7 |
| 2018/0162771 A1 | 6/2018 | Fujii |

FOREIGN PATENT DOCUMENTS

| | | | |
|---|---|---|---|
| CN | 104955783 | 9/2015 | |
| DE | 10 2008 045 997 A1 | 4/2009 | |
| DE | 11 2014 000 613 T5 | 10/2015 | |
| JP | 2005-266291 | 9/2005 | |
| JP | 3700358 B2 | 9/2005 | |
| JP | 2008-107756 A | 5/2008 | |
| JP | 2012-31494 | 2/2012 | |
| JP | 2012-88684 | 5/2012 | |
| JP | 2013-139381 A | 7/2013 | |
| JP | 2013-242725 | 12/2013 | |
| JP | 2014-47109 | 3/2014 | |
| JP | 2015-142987 | 8/2015 | |
| KR | 10-2015-0112972 | 10/2015 | |
| TW | 201434775 A | 9/2014 | |
| WO | WO 2013/089178 A1 | 6/2013 | |
| WO | WO-2013088999 A1 * | 6/2013 | ............... B32B 7/12 |
| WO | WO-2014050798 A1 * | 4/2014 | ........... C03C 21/002 |
| WO | WO 2014/119453 A1 | 8/2014 | |
| WO | WO 2017/026318 A1 | 2/2017 | |

OTHER PUBLICATIONS

Written Opinion dated Sep. 20, 2016 in PCT/JP2016/072555, filed on Aug. 1, 2016.

* cited by examiner

GLASS PLATE WITH ANTIFOULING LAYER

CROSS-REFERENCE TO RELATED APPLICATIONS

This application is a continuation of prior International Application No. PCT/JP2016/072555 filed on Aug. 1, 2016 which is based upon and claims the benefit of priority from Japanese Patent Application No. 2015-158418 filed on Aug. 10, 2015; the entire contents of all of which are incorporated herein by reference.

FIELD

The present invention relates to a glass plate with an antifouling layer.

BACKGROUND

A lot of glass substrates have been used for touch panels and protection panels in portable equipment such as a smartphone, a tablet PC, and a car navigator. The glass substrate is required to have high strength.

Human fingers are in touch with these touch panels when they are used, and therefore, fouling due to fingerprints, sebum, swear, and so on are easy to adhere thereto. An antifouling layer including water repellency and oil repellency is therefore formed at a part where the human fingers are in tough.

The occurrence of microcracks of a glass substrate can be prevented at print time by forming an antifouling coating layer at an end face of the glass substrate in a cover glass for a track pad.

The antifouling coating layer formed on a principal surface on a side where a texture is not formed is subjected to an antifouling coating surface modification treatment, to thereby enable a direct printing on the antifouling coating layer and improve adherence of a printed layer formed by the printing.

However, a problem exists that adhesiveness of the antifouling coating layer to the glass substrate is low, and sufficient antifouling properties cannot be obtained. Besides, a problem exists that lowering of strength due to microcracks causing cracks is likely to occur especially at the end face of the cover glass due to the low adhesiveness of the antifouling coating layer to the glass substrate.

A problem exists that productivity and processability in an assembling process and the like to portable equipment or the like (hereinafter, called "post-processability") are low since a process further treating the surface on the side where the texture is not formed is added after the antifouling coating layer is formed.

SUMMARY

The present invention is made to solve the above-stated problems, and an object thereof is to provide a glass plate with an antifouling layer with excellent antifouling properties and having high strength particularly at an end face and having good post-processability by suppressing occurrence of microcracks which grow to cause origin of cracks (hereinafter, it is just called microcracks).

A glass plate with an antifouling layer according to the present invention includes: a glass plate having a first principal surface, a second principal surface opposite to the first principal surface, and an end face connecting the first principal surface and the second principal surface; an adhesive layer formed from the first principal surface to the end face of the glass plate; and an antifouling layer formed on the adhesive layer.

In the glass plate with the antifouling layer of the present invention, a printed layer formed at a peripheral edge part of the second principal surface is preferably further included. Besides, the adhesive layer and the antifouling layer are preferably further disposed over an outer periphery of an uppermost surface on the second principal surface side of the glass plate.

In the glass plate with the antifouling layer of the present invention, the adhesive layer and the antifouling layer preferably exist at an outside of an inner periphery of the printed layer and at an inside of an outer periphery of the printed layer.

In the glass plate with the antifouling layer of the present invention, the antifouling layer is preferably formed of a cured matter of a film-forming composition containing a fluorine-containing hydrolyzable silicon compound. Besides, an uppermost surface of the adhesive layer is preferably formed of a silicon oxide. Further, the first principal surface preferably has a projecting and recessed shape.

According to a glass plate with an antifouling layer of the present invention, a glass plate with an antifouling layer with excellent antifouling properties, having high strength particularly at an end face, and having good post-processability can be obtained.

DETAILED DESCRIPTION

Hereinafter, embodiments of the present invention are described in detail with reference to the drawings.

[Glass Plate with Antifouling Layer]

Figure 1:
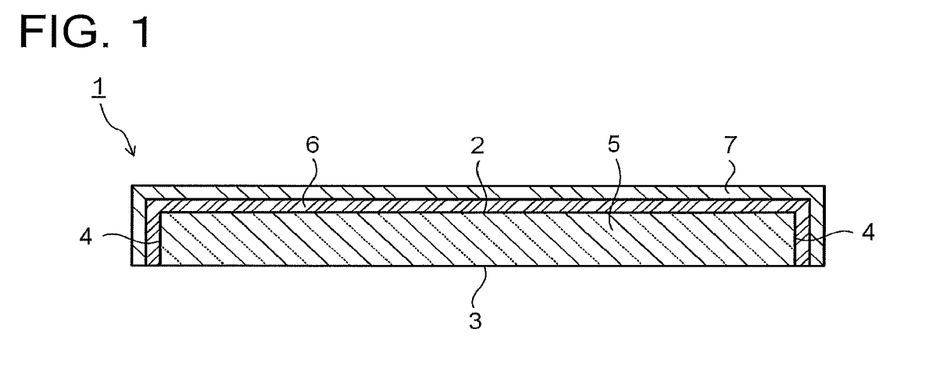
FIG. 1 is a sectional view schematically illustrating a glass plate with an antifouling layer of an embodiment.

FIG. 1 is a sectional view schematically illustrating a glass plate 1 with an antifouling layer of a first embodiment. The glass plate 1 with the antifouling layer illustrated in FIG. 1 includes a glass plate 5 having a first principal surface 2 and a second principal surface 3 opposite to each other, and an end face 4 connecting the first principal surface 2 and the second principal surface 3. The glass plate 1 with the antifouling layer further includes an adhesive layer 6 and an antifouling layer 7 from the first principal surface 2 to the end face 4 of the glass plate 5, the adhesive layer formed on the first principal surface 2 and on the end face 4, the antifouling layer 7 formed on the adhesive layer 6.

In the glass plate 1 with the antifouling layer of this embodiment, a shape of the glass plate 5 is not particularly limited as long as the first principal surface 2, the second principal surface 3 opposite to the first principal surface 2, and the end face 4 are included. For example, a shape of the first principal surface 2 of the glass plate 5 may be a circular shape, an ellipse shape, and the like in addition to a quadrangular shape, or may be formed into a desired shape according to purposes. The end face 4 is not limited to a mode provided on an outer peripheral side of the first principal surface 2 and the second principal surface 3. The glass plate 5 may have a hole penetrating from the first principal surface 2 through the second principal surface 3, and in this case, an inner surface of the hole connecting the first principal surface 2 and the second principal surface 3 forms the end face 4. A shape of the hole in this case is not also particularly limited.

The adhesive layer 6 is formed by using an adhesive layer forming material, and supplies adhesiveness between the antifouling layer 7 and the glass plate 5. The adhesive layer 6 is not particularly limited as long as it has a constitution supplying the adhesiveness between the antifouling layer 7 and the glass plate 5, and it may be constituted by a single layer, or a multilayer structure made up of a plurality of layers. A layer whose uppermost surface layer is formed of a silicon oxide is preferable as the adhesive layer 6. The layer formed of the silicon oxide has a hydroxyl group at a surface. Accordingly, for example, when a fluorine-hydrolyzable silicon compound is used as an antifouling layer forming material as described later, the number of adhered points due to a siloxane bond becomes large between the layer formed of the silicon oxide and the antifouling layer 7, and it can be thought that firm adhesiveness between the antifouling layer 7 and the adhesive layer 6 is obtained. The antifouling layer 7 is thereby formed on the glass plate 5 via the adhesive layer 6 with good adhesiveness. The adhesive layer 6 is preferably formed by sputtering from a viewpoint of improving the adhesiveness.

The antifouling layer 7 exerts antifouling properties due to having water repellency and oil repellency, and is formed by using the antifouling layer forming material. A forming method of the antifouling layer 7 is not particularly limited, and a wet method or a vapor deposition method can be used. The forming method of the antifouling layer 7 is preferably the vapor deposition method from a viewpoint of improving the antifouling properties.

For example, the fluorine hydrolyzable silicon compound is used as the antifouling layer forming material, as described later. In case of the vapor deposition method, the antifouling layer 7 is formed by a hydrolysis and condensation reaction of a fluorine-containing hydrolyzable silicon compound at a surface of the adhesive layer 6 as described below. In the present description, the fluorine-containing hydrolyzable silicon compound is a compound which has a hydrolyzable silyl group where a hydrolyzable group or atom is bonded to a silicon atom, and further has a fluorine-containing organic group which bonds to the silicon atom. Note that the hydrolyzable groups and atoms which form the hydrolyzable silyl group by bonding to the silicon atom are both called a "hydrolyzable group".

Namely, the hydrolyzable silyl group of the fluorine-containing hydrolyzable silicon compound becomes a silanol group due to the hydrolysis, further dehydration condensation occurs between molecules to generate a siloxane bond represented by Si—O—Si, to thereby form a fluorine-containing organosilicon compound film. At the fluorine-containing organosilicon compound film, most of the fluorine-containing organic groups bonded to the silicon atom of the siloxane bond exist in a vicinity of a surface of the film on the adhesive layer 6 side, and the water repellency and the oil repellency can be exhibited by an action of the fluorine-containing organic group. In this case, the silanol group chemically bonds to a hydroxyl group at a surface of the adhesive layer 6 on the antifouling layer 7 side being a film-formation object surface where the antifouling layer 7 is formed, preferably at a surface of the layer formed of the silicon oxide, by a dehydration condensation reaction, to form adhered points through the siloxane bond. As stated above, in the glass plate 1 with the antifouling layer, the glass plate 1 with the antifouling layer has excellent antifouling properties because the antifouling layer 7 is firmly adhered to the glass plate 5 via the adhesive layer 6.

In the glass plate 1 with the antifouling layer of this embodiment, the adhesive layer 6 and the antifouling layer 7 are provided from the first principal surface 2 to the end face 4 of the glass plate 5 in this order. In the glass plate 1 with the antifouling layer, it can be thought that a surface of the end face 4 is protected by the antifouling layer 7 adhered thereto via the adhesive layer 6, and thereby, occurrence of microcracks which can be origin of cracks especially at the end face 4 can be suppressed. The glass plate 1 with the antifouling layer therefore has high strength.

In this case, a region where the adhesive layer 6 and the antifouling layer 7 are disposed is not limited to a mode where a whole surface of the first principal surface 2 and the end face 4 of the glass plate 5 is covered with the adhesive layer 6 and the antifouling layer 7 without any space, and a region without the adhesive layer 6 or the antifouling layer 7 can be formed within a range exerting the same effect as the mode covered without any space. At the glass plate 1 with the antifouling layer, the excellent antifouling properties are mainly required for the first principal surface 2. The adhesive layer 6 and the antifouling layer 7 are therefore preferably formed at approximately the whole surface of the first principal surface 2. In particular, at the end face 4, it is mainly required that the occurrence of microcracks which can be origin of cracks is suppressed to improve the strength of the glass plate 1 with the antifouling layer. Accordingly, the adhesive layer 6 and the antifouling layer 7 are required to be formed on the end face 4 to a degree capable of suppressing the occurrence of microcracks as stated above.

For example, the region without the adhesive layer 6 or the antifouling layer 7 can be formed on the first principal surface 2 and the end face 4 depending on forming methods of the adhesive layer 6 and the antifouling layer 7 as described below. However, the adhesive layer 6 and the antifouling layer 7 may be provided on a major region of the first principal surface 2 and the end face 4 in a mode where the adhesive layer 6 and the antifouling layer 7 can exert respective functions. When the region without the adhesive layer 6 or the antifouling layer 7 exists on the first principal surface 2 and the end face 4, the region may not have both of the adhesive layer 6 and the antifouling layer 7, or either one of them.

Each of thicknesses of the adhesive layer 6 and the antifouling layer 7 is preferably uniform at a region where the adhesive layer 6 and the antifouling layer 7 are provided, but not limited thereto. The thicknesses of the adhesive layer 6 and the antifouling layer 7 are not necessarily uniform as long as they can exert the respective functions. For example, the thicknesses of the adhesive layer 6 and the antifouling layer 7 are preferably uniform on the first principal surface 2 from a viewpoint of improving visibility of a display part when the glass plate 1 with the antifouling layer is assembled to a display device of a cellular phone, a television, a PC, a car navigator, and so on. On the other hand, the adhesive layer 6 and the antifouling layer 7 may be formed with a thickness capable of suppressing the occurrence of microcracks as stated above on the end face 4.

Here, for example, when the adhesive layer 6 is formed by the sputtering and the antifouling layer 7 is formed by the vapor deposition method on the glass plate 5 under a state, for example, where a carrier substrate is provided on the second principal surface 3 side, the adhesive layer forming material and the antifouling layer forming material go around from the first principal surface 2 side to the end face 4 to be adhered to an uppermost surface of the end face 4 as described later. The adhesive layer 6 and the antifouling layer 7 are thereby formed from the first principal surface 2 to the end face 4. In this case, it can be thought that the adhesive layer 6 or the antifouling layer 7 is uniformly formed on the first principal surface 2 with a certain thickness, and the adhesive layer 6 or the antifouling layer 7 in island states are irregularly disposed in spots on the end face 4 to form the region without the adhesive layer 6 or the antifouling layer 7.

The glass plate 1 with the antifouling layer is able to improve post-processability, particularly, an adhesive property with a display device or the like owing that the adhesive layer 6 and the antifouling layer 7 are not formed on the second principal surface 3.

It is preferable that the adhesive layer 6 and the antifouling layer 7 are respectively continuously disposed up to near an outer periphery of an uppermost surface of the second principal surface 3 of the glass plate 5 from a viewpoint of further improving the strength of the glass plate 1 with the antifouling layer. When the adhesive layer 6 and the antifouling layer 7 are disposed on the uppermost surface of the second principal surface 3 of the glass plate 5, the adhesive layer 6 is formed on the uppermost surface of the second principal surface 3, and the antifouling layer 7 is formed on the adhesive layer 6. The glass plate 1 with the antifouling layer where the adhesive layer 6 and the antifouling layer 7 are formed from the first principal surface 2 to the end face 4, further to near the outer periphery of the uppermost surface of the second principal surface 3 is able to further improve the strength of the glass plate 1 with the antifouling layer while keeping the sufficient and good post-processability, by suppressing the occurrence of microcracks especially at the end face.

When the adhesive layer 6 and the antifouling layer 7 are disposed from the first principal surface 2 to the end face 4, further to near the outer periphery of the uppermost surface of the second principal surface 3, a width of each of the adhesive layer 6 and the antifouling layer 7 at the second principal surface 3, that is, a distance from the outer periphery to near the outer periphery of the second principal surface 3 where the adhesive layer 6 and the antifouling layer 7 are provided is appropriately selected according to application within a range where the post-processability is kept as stated above. The widths of the adhesive layer 6 and the antifouling layer 7 can be appropriately set depending on a bonding position when, for example, the glass plate 1 with the antifouling layer is assembled to a display device of portable equipment or the like as a cover glass or a touch panel. That is, when the antifouling layer 7 is provided at an adhering part to adhere an adhesive material when the glass plate 1 with the antifouling layer and the display device are bonded, the adhesive material is likely to be peeled off due to the antifouling layer 7, and a trouble such that the adhesive force between the glass plate 1 with the antifouling layer and the display device decreases or the like occurs. In such a case, the widths of the adhesive layer 6 and the antifouling layer 7 are preferably set so as not to be overlapped with the adhesion part where the adhesive material is to be adhered.

The adhesive layer 6 and the antifouling layer 7 may be provided at all of the region from the outer periphery to near the outer periphery of the second principal surface 3, or may be provided at a part of the region from the outer periphery to near the outer periphery of the second principal surface 3.

Here, the adhesive layer 6 is formed by the sputtering and the antifouling layer 7 is formed by the vapor deposition method similar to the above, and thereby, the adhesive layer forming material and the antifouling layer forming material are made to go around from the first principal surface 2 side to the end face 4, and further to reach near the outer periphery of the uppermost surface of the second principal surface 3. The adhesive layer 6 and the antifouling layer 7 are thereby formed up to a part away from the outer periphery of the second principal surface 3 toward an inside for a predetermined distance, that is, to near the outer periphery. In the present description, an outer peripheral side when seen from a center part is called an outside and a center part side when seen from the outer periphery is called an inside at the principal surface of the glass plate 5.

Next, each constitution of the glass plate 1 with the antifouling layer according to the embodiment of the present invention is described in detail.

(Glass Plate 5)

The glass plate 5 used for the glass plate 1 with the antifouling layer of this embodiment is not particularly limited as long as it is a transparent glass plate where supplying of the antifouling properties by the antifouling layer is generally required. A general glass whose major component is silicon dioxide, for example, a glass plate such as soda-lime silicate glass, aluminosilicate glass, borosilicate glass, non-alkali glass, quartz glass can be used.

A glass composition of the glass plate 5 is preferably a composition where molding and tempering by chemical tempering can be performed, and preferably contains sodium. As the glass as stated above, concretely, for example, the aluminosilicate glass, the soda-lime silicate glass, the borosilicate glass, lead glass, alkali barium glass, aluminoborosilicate glass, and so on are preferably used.

The glass composition of the glass plate 5 used in the embodiment is not particularly limited, and glasses having various compositions can be used. As the glass composition, for example, there can be cited the following glass compositions (they are all the aluminosilicate glasses).

(i) In the composition represented by mol %, glass containing 50% or more and 80% or less $SiO_2$, 2% or more and 25% or less $Al_2O_3$, "0" (zero) % or more and 10% or less $Li_2O$, "0" (zero) % or more and 18% or less $Na_2O$, "0" (zero) % or more and 10% or less $K_2O$, "0" (zero) % or more and 15% or less MgO, "0" (zero) % or more and 5% or less CaO, and "0" (zero) % or more and 5% or less $ZrO_2$ (ii) In the composition represented by mol %, glass containing 50% or more and 74% or less $SiO_2$, 1% or more and 10% or less $Al_2O_3$, 6% or more and 14% or less $Na_2O$, 3% or more and 11% or less $K_2O$, 2% or more and 15% or less MgO, "0" (zero) % or more and 6% or less CaO, and "0" (zero) % or more and 5% or less $ZrO_2$, a sum total of contents of $SiO_2$ and $Al_2O_3$ is 75% or less, a sum total of contents of $Na_2O$ and $K_2O$ is 12% or more and 25% or less, and a sum total of contents of MgO and CaO is 7% or more and 15% or less (iii) In the composition represented by mol %, glass containing 68% or more and 80% or less $SiO_2$, 4% or more and 10% or less $Al_2O_3$, 5% or more and 15% or less $Na_2O$, "0" (zero) % or more and 1% or less $K_2O$, 4% or more and 15% or less MgO, and "0" (zero) % or more and 1% or less $ZrO_2$ (iv) In the composition represented by mol %, glass containing 67% or more and 75% or less $SiO_2$, "0" (zero) % or more and 4% or less $Al_2O_3$, 7% or more and 15% or less $Na_2O$, 1% or more and 9% or less $K_2O$, 6% or more and 14% or less MgO, and "0" (zero) % or more and 1.5% or less $ZrO_2$, a sum total of contents of $SiO_2$ and $Al_2O_3$ is 71% or more and 75% or less, a sum total of contents of $Na_2O$ and $K_2O$ is 12% or more and 20% or less, and when CaO is contained, a content thereof is less than 1%

A manufacturing method of the glass plate 5 is not particularly limited, and it can be manufactured by inputting desired glass raw materials into a continuous melting furnace, heating and melting the glass raw materials at preferably 1500° C. or more and 1600° C. or less, fining, and thereafter, supplying to a molding apparatus to mold the molten glass into a plate shape, and slow cooling.

A molding method of the glass plate 5 is also not particularly limited, and for example, there can be used the molding methods such as a down-draw method (for example, an overflow down-draw method, a slot down method, a redraw method, and so on), a float method, a roll-out method, and a pressing method.

A thickness of the glass plate 5 can be appropriately selected in accordance with the application. The thickness of the glass plate 5 is preferably 0.1 mm or more and 5 mm or less, more preferably 0.2 mm or more and 2 mm or less, and further preferably 0.5 mm or more and 2 mm or less. When the thickness of the glass plate 5 is 5 mm or less, the later-described chemical tempering for the glass plate 5 can be performed effectively when it is performed, and both reduction in weight and high strength can be enabled. The thickness of the glass plate 5 is more preferably 3 mm or less from a viewpoint of effectively performing the chemical tempering.

(Antiglare Treatment)

In the glass plate 1 with the antifouling layer of this embodiment, the first principal surface 2 of the used glass plate 5 preferably has a projecting and recessed shape to supply antiglare property to the glass plate 1 with the antifouling layer.

As a method forming the projecting and recessed shape, publicly-known methods can be used, and for example, a method performing antiglare treatment is used. The antiglare treatment is not particularly limited as long as it is a method capable of forming the projecting and recessed shape which is able to supply the antiglare property. For example, the first principal surface 2 of the glass plate 5 is subjected to a surface treatment of applying a chemical method or a physical method to form the projecting and recessed shape with desired roughness.

As the antiglare treatment by the chemical method, concretely, there can be cited a method performing frost treatment. The frost treatment is performed by, for example, immersing the glass plate 5 being a treatment object in a mixed solution of hydrogen fluoride and ammonium fluoride.

As the antiglare treatment by the physical method, there are performed by, for example, what is called a sand-blast process where a crystalline silicon dioxide powder, a silicon carbide powder, and so on are blasted to the surface of the glass plate 5 by using pressurized air, a method where a brush having the crystalline silicon dioxide powder, the silicon carbide powder, and so on adhered thereto is moistened with water, and the surface of the glass plate 5 is polished by using the brush, and so on.

Among them, the frost treatment being the chemical surface treatment can be preferably used because microcracks which may cause an origin of cracks at the surface of the treatment object are unlikely to occur, and the lowing of the strength of the glass plate 5 is unlikely to occur.

Further, it is preferable to perform an etching process for the first principal surface 2 of the glass plate 5 which is subjected to the antiglare treatment, to regulate the surface shape of the first principal surface 2. As the etching process, for example, there can be used a method where the glass plate 5 is immersed in an etching solution being an aqueous solution of hydrogen fluoride to chemically perform the etching. The etching solution may contain an acid such as a hydrochloric acid, a nitric acid, and a citric acid in addition to the hydrogen fluoride. These acids are contained in the etching solution, and thereby, it is possible to suppress a local occurrence of precipitates due to a reaction between cation components such as Na ions, K ions contained in the glass plate 5 and the hydrogen fluoride, and the etching can be uniformly proceeded in a treatment surface.

When the etching process is performed, an etching amount can be adjusted by adjusting a concentration of the etching solution, an immersion time of the glass plate 5 into the etching solution, and so on, and thereby, a haze value of an antiglare treatment surface of the glass plate 5 can be adjusted to a desired value. Besides, when the antiglare treatment is performed by the physical surface treatment such as the sand-blast process, there is a case when cracks occur at the glass plate 5, but the cracks can be removed by the etching process. Besides, an effect to suppress dazzle of the glass plate 1 with the antifouling layer can also be obtained by the etching process.

As the shape of the first principal surface 2 of the glass plate 5 after the antiglare treatment and the etching process according to need are performed, a surface roughness (a root mean square roughness RMS) is preferably 0.01 μm or more and 0.5 μm or less, more preferably 0.01 μm or more and 0.3 μm or less, and further preferably 0.01 μm or more and 0.2 μm or less. The surface roughness (RMS) falls within the above-stated range, and thereby, it is possible to adjust the haze value of the first principal surface 2 after the antiglare treatment to be 1% or more and 30% or less, and it is possible to supply the excellent antiglare property to the obtained glass plate 1 with the antifouling layer.

Note that the surface roughness (RMS) can be measured based on a method defined by JIS B 0601: (2001). As a measurement method of the surface roughness (RMS), concretely, a visual field range of 300 μm×200 μm is set with respect to a measurement surface of the glass plate 5 being a sample after the antiglare treatment, and height information of the glass plate 5 is measured by a laser microscope (manufactured by KEYENCE CORPORATION, product name: VK-9700). A cut-off correction is performed for the measurement value, and by determining a mean square of the obtained heights, it is possible to calculate the surface roughness (RMS). It is preferable to use 0.08 mm as the cut-off value. The haze value is a value measured by a definition of JIS K 7136.

The surface of the first principal surface 2 after being subjected to the antiglare treatment and the etching process has the projecting and recessed shape, and when the surface of the first principal surface 2 is observed from above the first principal surface 2 side of the glass plate 5, the recessed parts are observed as circular pores. A size (diameter) of each circular pore observed as above is preferably 1 μm or more and 10 µm or less. When the size of the circular pore falls within this range, it is possible to enable both of the prevention of dazzle and the antiglare property of the glass plate 1 with the antifouling layer.

(Chemical Tempering)

At the glass plate 1 with the antifouling layer, the glass plate 5 is preferably subjected to the chemical tempering so as to increase the strength of the glass plate 1 with the antifouling layer. The chemical tempering is preferably performed after the glass plate 5 subjected to the antiglare treatment is cut into a desired size according to need.

The chemical tempering method is not particularly limited, and the first principal surface 2, the second principal surface 3, and the end face 4 of the glass plate 5 are ion-exchanged to form a surface layer where a compressive stress remains. Concretely, an alkali metal ion whose ion radius is small (for example, Li ions, Na ions) contained in the glass at the surface of the glass plate 5 are exchanged into the alkali metal ion whose ion radius is larger (for example, Na ions or K ions with respect to Li ions, and K ions with respect to Na ions) at a temperature lower than a glass transition point. The compressive stress thereby remains at the first principal surface 2, the second principal surface 3, and the end face 4 of the glass plate 5, and the strength of the glass plate 5 is improved.

(Adhesive Layer 6)

The adhesive layer 6 is formed by the adhesive layer forming material capable of supplying the adhesiveness between the glass plate 5 and the antifouling layer 7 as described above. When the uppermost layer of the adhesive layer 6 is a layer formed of silicon oxide, the layer formed of the silicon oxide can be formed by the similar method as a later-described low-refractive index layer using silicon oxide ($SiO_2$) as a material in a later-described low-reflection film. When the later-described low-reflection film has a constitution where an uppermost layer thereof is the low-refractive-index layer of the silicon oxide ($SiO_2$), the low-reflection film functions as the adhesive layer 6.

(Low-Reflection Film)

The glass plate 1 with the antifouling layer of this embodiment preferably includes the low-reflection film between the first principal surface 2 and the antifouling layer 7. When the glass plate 5 has the projecting and recessed shape, the low-reflection film is preferably provided on a surface having the projecting and recessed shape (hereinafter, it is also called an "antiglare-treated surface"). A constitution of the low-reflection film is not particularly limited as long as it has a constitution capable of suppressing reflection of light, and for example, it may have the constitution where a high-refractive-index layer whose refractive index at a wavelength of 550 nm is 1.9 or more and a low-refractive-index layer whose refractive index at a wavelength of 550 nm is 1.6 or less are stacked.

The high-refractive-index layer and the low-refractive-index layer in the low-reflection film may be in a mode where one layer is each included, or in a mode where two layers or more are each included. When two layers or more of each of the high-refractive-index layers and the low-refractive-index layers are included in the low-reflection film, it is preferably in a mode where the high-refractive-index layers and the low-refractive-index layers are alternately stacked.

The low-reflection film is preferably a stack where a plurality of layers are stacked in order to reduce its reflectivity. For example, the number of layers to be stacked of the stack is preferably two layers or more and six layers or less as a total, more preferably two layers or more and four layers or less. The stack described here is preferably a stack where the high-refractive-index layers and the low-refractive-index layers are stacked as stated above, and a total sum of the number of layers of each of the high-refractive-index layers and the low-refractive-index layers is preferably in the above-stated range.

Materials forming the high-refractive-index layer and the low-refractive-index layer are not particularly limited, and they can be appropriately selected in consideration of a degree of required low-reflective property, productivity, and so on. As the material forming the high-refractive-index layer, for example, there can be preferably used one kind or more selected from a niobium oxide ($Nb_2O_5$), a titanium oxide ($TiO_2$), a zirconium oxide ($ZrO_2$), a tantalum oxide ($Ta_2O_5$), and a silicon nitride (SiN). As the material forming the low-refractive-index layer, there can be preferably used one kind or more selected from the silicon oxide ($SiO_2$), a material containing a mixed oxide of Si and Sn, a material containing a mixed oxide of Si and Zr, and a material containing a mixed oxide of Si and Al.

The constitution is preferable where the high-refractive-index layer is a layer formed of one kind of compound selected from the niobium oxide, the titanium oxide, and the silicon nitride, and the low-refractive-index layer is a layer formed of the silicon oxide from viewpoints of the productivity and the refractive index.

A method of film-forming each layer forming the low-reflection film is not particularly limited, and various film-forming methods can be used. For example, there can be used a vacuum deposition method, an ion beam assisted vapor deposition method, an ion plating method, a sputtering method, a plasma CVD method, and so on. Among these film-forming methods, the sputtering method is preferably used because it is possible to form a dense low-reflection film with high durability. In particular, it is preferable to film-form the low-reflection film by the sputtering method such as a pulse sputtering method, an AC sputtering method, or a digital sputtering method.

For example, when the low-reflection film is film-formed by the pulse sputtering method, the glass plate 5 is disposed in a chamber in a mixed gas atmosphere of inert gas and oxygen gas, and a target is selected to be film-formed so as to enable a desired composition. At this time, a kind of gas of the inert gas in the chamber is not particularly limited, and there can be used various inert gases such as argon and helium.

A pressure in the chamber by the mixed gas of the inert gas and the oxygen gas is not particularly limited, but when it is set to fall within a range of 0.5 Pa or less, it becomes easy to set surface roughness of the film to be formed to fall within a preferable range. It can be considered that this is because of the reasons described below. Namely, when the pressure in the chamber by the mixed gas of the inert gas and the oxygen gas is 0.5 Pa or less, a mean free path of film-forming molecules is secured, and the film-forming molecules reach the glass plate with more energy. Accordingly, it can be considered that reallocation of the film-forming molecules is accelerated, resulting in that a film having a relatively dense and smooth surface is formed. A lower limit value of the pressure in the chamber by the mixed gas of the inert gas and the oxygen gas is not particularly limited, but for example, it is preferably 0.1 Pa or more.

When the high-refractive-index layer and the low-refractive-index layer are film-formed by the pulse sputtering method, it is possible to adjust a layer thickness of each layer by, for example, adjustment of discharge power, adjustment of a film-forming time, and so on.

(Antifouling Layer 7)

The antifouling layer 7 is formed on the surface of the adhesive layer 6. The antifouling layer 7 is not particularly limited as long as the antifouling properties can be supplied to the obtained glass plate 1 with the antifouling layer by having, for example, the water repellency and the oil repellency. However, it is preferable that the antifouling layer 7 is formed of a fluorine-containing organosilicon compound film obtained by curing a fluorine-containing organosilicon compound.

A thickness of the antifouling layer 7 is not particularly limited, but when the antifouling layer 7 is formed of the fluorine-containing organosilicon compound film, the thickness of the antifouling layer 7 on the first principal surface 2 is preferably 2 nm or more and 20 nm or less, more preferably 2 nm or more and 15 nm or less, and further preferably 2 nm or more and 10 nm or less. When the thickness of the antifouling layer 7 on the first principal surface 2 is 2 nm or more, it becomes a state where the surface on the first principal surface 2 of the glass plate 5 is uniformly covered with the antifouling layer 7, and it fits for practical use from a viewpoint of scratch resistance. When the thickness of the antifouling layer 7 on the first principal surface 2 is 20 nm or less, optical characteristics such as the haze value of the glass plate 1 with the antifouling layer under the state where the antifouling layer 7 is formed become fine.

As a method forming the fluorine-containing organosilicon compound film, there can be cited a method where a composition of a silane coupling agent having a fluoroalkyl group such as a perfluoroalkyl group and the fluoroalkyl group which contains a perfluoro(polyoxyalkylene) chain is coated on the surface of the adhesive layer 6 formed on the first principal surface 2 of the glass plate 5 by a spin coating method, a dip coating method, a casting method, a slit coating method, a spray coating method, and so on, and thereafter, heat treatment is performed, the vacuum deposition method where the fluorine-containing organosilicon compound is vapor-phase deposited on the surface of the adhesive layer 6, and thereafter, heat treatment is performed, and so on. It is preferable to form the antifouling layer 7 by the vacuum deposition method to obtain the fluorine-containing organosilicon compound film with high adhesiveness. The formation of the fluorine-containing organosilicon compound film through the vacuum deposition method is preferably performed by using a film-forming composition containing a fluorine-containing hydrolyzable silicon compound.

The film-forming composition is a composition containing the fluorine-containing hydrolyzable silicon compound, and the composition is not particularly limited as long as the film-formation by the vacuum deposition method is possible. The film-forming composition may contain an arbitrary component other than the fluorine-containing hydrolyzable silicon compound, and may be formed of only the fluorine-containing hydrolyzable silicon compound. As the arbitrary component, there can be cited a hydrolyzable silicon compound which does not have fluorine atoms (hereinafter, it is called a "non-fluorine hydrolyzable silicon compound"), a catalyst, and so on which are used within a range not disturbing the effects of the present invention.

(Fluorine-Containing Hydrolyzable Silicon Compound)

The fluorine-containing hydrolyzable silicon compound used for the formation of the fluorine-containing organosilicon compound film of the present invention is not particularly limited as long as the obtained fluorine-containing organosilicon compound film has the antifouling properties such as the water repellency and the oil repellency.

Concretely, there can be cited the fluorine-containing hydrolyzable silicon compound having one or more groups selected from a group made up of a perfluoropolyether group, a perfluoroalkylene group, and a perfluoroalkyl group. These groups exist as a fluorine-containing organic group which is bonded to silicon atoms of the hydrolyzable silyl group through a linking group or directly. Note that the perfluoropolyether group is a divalent group having a structure where the perfluoroalkylene group and ether oxygen atoms are alternately bonded.

As a commercially available fluorine-containing organosilicon compound (fluorine-containing hydrolyzable silicon compound) having one or more groups selected from a group made up of the perfluoropolyether group, the perfluoroalkylene group, and the perfluoroalkyl group, there can be preferably used KP-801 (product name, manufactured by Shin-Etsu Chemical Co., Ltd.), X-71 (product name, manufactured by Shin-Etsu Chemical Co., Ltd.), KY-130 (product name, manufactured by Shin-Etsu Chemical Co., Ltd.), KY-178 (product name, manufactured by Shin-Etsu Chemical Co., Ltd.), KY-185 (product name, manufactured by Shin-Etsu Chemical Co., Ltd.), OPTOOL (registered trademark) DSX (product name, manufactured by DAIKIN Industries, Ltd.), and so on. Among the above, it is more preferable to use KY-185, OPTOOL DSX.

Note that when the commercially available fluorine-containing hydrolyzable silicon compound is supplied together with a solvent, the commercially available fluorine-containing hydrolyzable silicon compound is preferably used after removing the solvent. The film-forming composition used in the present invention is prepared by mixing the above-stated fluorine-containing hydrolyzable silicon compound and the arbitrary component added according to need, and supplied to the vacuum deposition.

The film-forming composition containing the fluorine-containing hydrolyzable silicon compound as above is adhered to the surface of the adhesive layer 6 and reacted to be film-formed, and thereby, the fluorine-containing organosilicon compound film is obtained. In this case, the antifouling layer 7 is formed of a cured matter of the film-forming composition containing the fluorine-containing hydrolyzable silicon compound. Note that as for the concrete vacuum deposition method, and reaction conditions, conventionally publicly-known methods, conditions, and so on are applicable.

(Glass Plate with Antifouling Layer Including Printed Layer)

Figure 2:
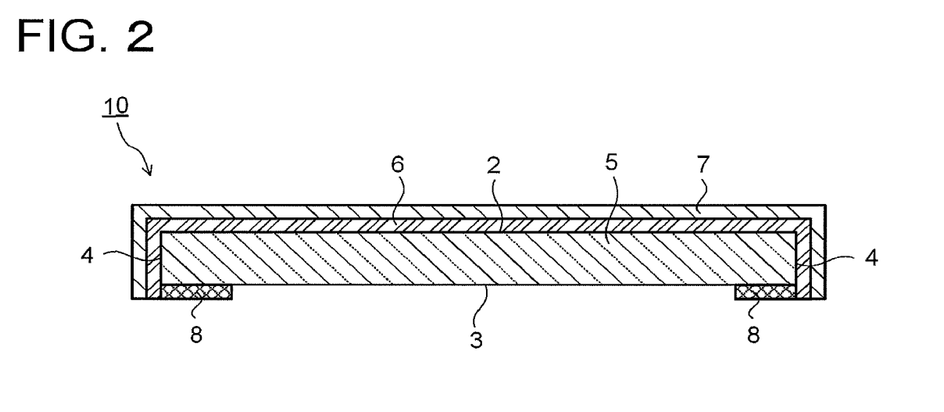
FIG. 2 is a sectional view schematically illustrating a glass plate with an antifouling layer including a printed layer.
Figure 3:
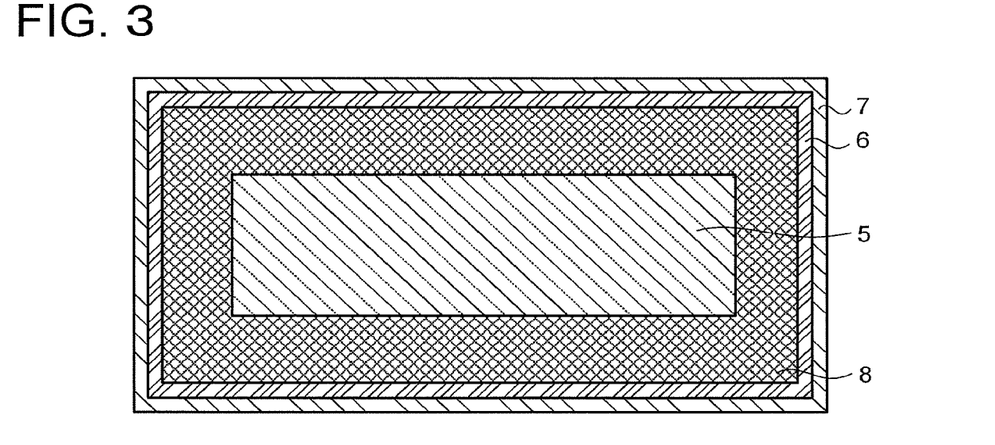
FIG. 3 is a plan view of the glass plate with the antifouling layer illustrated in FIG. 2.

The glass plate 1 with the antifouling layer preferably includes a printed layer on the second principal surface 3. FIG. 2 is a sectional view schematically illustrating a glass plate 10 with an antifouling layer including a printed layer 8 on the second principal surface 3. FIG. 3 is a bottom view of the glass plate 10 with the antifouling layer illustrated in FIG. 2 where the second principal surface 3 is set to be a bottom surface. The glass plate 10 with the antifouling layer according to a second embodiment is different from the glass plate 1 with the antifouling layer in a point that the glass plate 1 with the antifouling layer further includes the printed layer 8 formed on the second principal surface 3, but other constitutions are the same as the glass plate 1 with the antifouling layer. In the glass plate 10 with the antifouling layer illustrated in FIG. 2 and FIG. 3, the same reference symbols are supplied for the constitutions exerting similar functions as the glass plate 1 with the antifouling layer and redundant explanation is not given.

In the glass plate 10 with the antifouling layer, the printed layer 8 is formed at a periphery of the second principal surface 3. The printed layer 8 is provided so as to conceal wiring circuits disposed in a vicinity of an outer periphery of a display device of portable equipment and an adhesive part between a casing of the portable equipment and the glass plate 10 with the antifouling layer, and so on to increase, for example, visibility and beauty of the display. Here, a peripheral edge part means a band-shaped region from an outer periphery toward a center part with a predetermined width. The printed layer 8 may be provided at a whole peripheral edge of the second principal surface 3, or at a part of the peripheral edge.

The outer periphery of the printed layer 8 may be in contact with a boundary between the second principal surface 3 and the end face 4, or may be at an inner side than the boundary between the second principal surface 3 and the end face 4. Here, the "outer periphery" of the printed layer 8 means an outer end of the printed layer 8, and an "inner periphery" of the printed layer 8 means an inner end of the printed layer 8.

A width of the printed layer 8 is not particularly limited, and can be appropriately changed according to purposes. For example, the printed layer 8 is provided with a width capable of concealing the wiring circuits and the adhesive part. The width of the printed layer 8 may be uniform at a whole region where the printed layer 8 is provided, or may have a region with a different width. A color of the printed layer 8 is not particularly limited, and a desired color can be selected according to purposes.

The adhesive layer 6 and the antifouling layer 7 are preferably disposed to near the outer periphery of the uppermost surface on the second principal surface 3 side of the glass plate 5 also in the glass plate 10 with the antifouling layer as same as the glass plate 1 with the antifouling layer. The strength of the glass plate 10 with the antifouling layer can be thereby improved.

Figure 4:
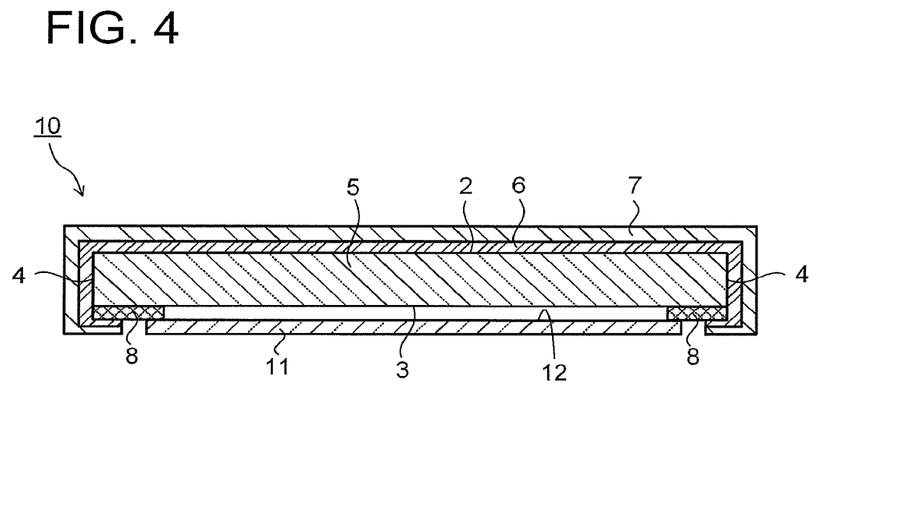
FIG. 4 is a sectional view schematically illustrating a state where the glass plate with the antifouling layer including the printed layer is assembled to a display device.
Figure 5:
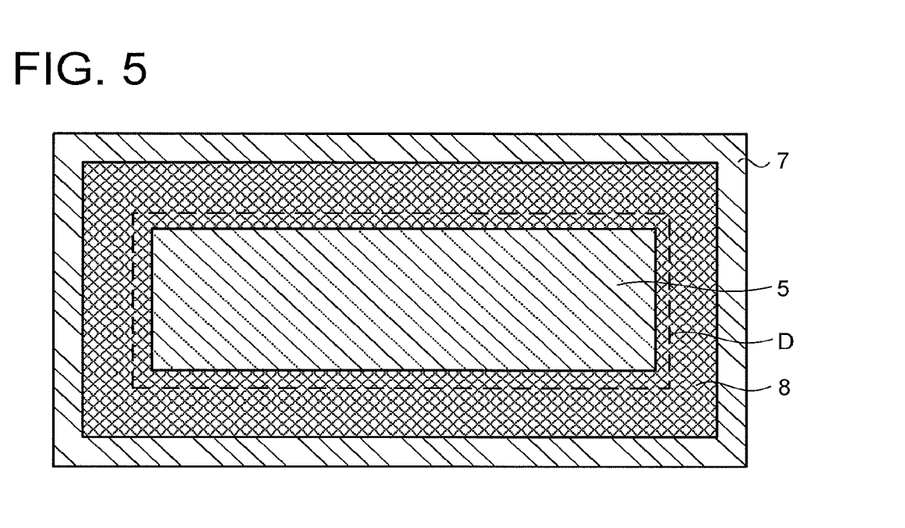
FIG. 5 is a plan view of the glass plate with the antifouling layer illustrated in FIG. 4.

FIG. 4 is a sectional view schematically illustrating a state where the glass plate 10 with the antifouling layer is assembled to a display device 11. FIG. 5 is a plan view of the glass plate 10 with the antifouling layer illustrated in FIG. 4 before being assembled to the display device 11 when the glass plate 10 with the antifouling layer is seen from the second principal surface 3 side. As illustrated in FIG. 4 and FIG. 5, the glass plate 10 with the antifouling layer is disposed on a display part 12 of the display device 11 under a state where the second principal surface 3 faces the display part 12. In FIG. 5, a dotted line D represents an outer periphery of the display device 11 disposed on the second principal surface 3 side of the glass plate 10 with the antifouling layer. In the glass plate 10 with the antifouling layer, when the adhesive layer 6 and the antifouling layer 7 are disposed over the uppermost surface on the second principal surface 3 side of the glass plate 5, that is, to near the outer periphery of the surface of the printed layer 8, the adhesive layer 6 and the antifouling layer 7 preferably exist outside the inner periphery of the printed layer 8 and inside the outer periphery of the printed layer 8 on the surface of the printed layer 8 as illustrated in FIGS. 4, 5, for example, and provided at a part on the printed layer 8 on the second principal surface 3. This is because the adhesive material is generally disposed on the printed layer 8 from a viewpoint of the beauty when the glass plate 10 with the antifouling layer is bonded to the display device 11. When the adhesive layer 6 and the antifouling layer 7 exist outside the inner periphery of the printed layer 8 and inside the outer periphery of the printed layer 8 on the surface of the printed layer 8, it is possible to avoid the problem that the adhesive force between the glass plate 10 with the antifouling layer and the display device 11 decreases, and to obtain good processability.

For example, when the glass plate 10 with the antifouling layer is bonded to the display device 11 or the like as illustrated in FIGS. 4, 5, it is disposed such that an opening part (a region without the printed layer 8 at the second principal surface 3 inside the inner periphery of the printed layer 8) of the glass plate 10 with the antifouling layer is located on the display part 12 of the display device 11. At this time, there is a case when a peripheral edge part of the display part 12 is overlapped with the printed layer 8. In such a case, the adhesive layer 6 and the antifouling layer 7 are preferably formed from the outer periphery of the printed layer 8 being the uppermost surface on the second principal surface 3 side up to a region at an outside than the part where the peripheral edge part of the display part 12 is overlapped with the printed layer 8. It is thereby possible to increase the visibility of the display part 12.

[Manufacturing Method of Glass Plate with Antifouling Layer]

The glass plates 1, 10 each with the antifouling layer are manufactured by forming the adhesive layer 6 and the antifouling layer 7 over the first principal surface 2 and the end face 4 of the glass plate 5 as described below. A carrier substrate whose area is larger than the second principal surface 3 of the glass plate 5 is bonded to the glass plate 5 on the second principal surface 3 side. In this case, the carrier substrate may be directly bonded to the second principal surface 3 of the glass plate 1 with the antifouling layer. In the glass plate 10 with the antifouling layer, the carrier substrate is preferably bonded to the printed layer 8. A material of the carrier substrate is not particularly limited as long as it can withstand conditions such as a temperature, a pressure, and an atmosphere, forming the adhesive layer 6 and the antifouling layer 7, and a substrate made of glass, resin, metal, and so on can be used. When the carrier substrate made of resin is used, an adhesive agent may be provided at a part or whole of a surface on a side of the carrier substrate where the glass plate 5 is to be bonded. A holding power of the glass plate 5 can be thereby increased, to enable stable production.

The adhesive layer forming material is sputtered toward the first principal surface 2 under a state where the glass plate 5 is bonded to the carrier substrate, to form the adhesive layer 6. The adhesive layer forming material goes around the end face 4 during the process of sputtering, to form the adhesive layer 6 on the end face 4.

Subsequently, the antifouling layer forming material is deposited toward the first principal surface 2 where the adhesive layer 6 is formed under the state where the glass plate 5 is bonded to the carrier substrate, to form the antifouling layer 7 on the surface of the adhesive layer 6. Also in this case, the antifouling layer forming material goes around the end face 4 during the process of deposition, to form the antifouling layer 7 on the surface of the adhesive layer 6 on the end face 4.

In this case, the adhesive layer 6 and the antifouling layer 7 can be formed up to near the outer periphery of the uppermost surface on the second principal surface 3 side by using the carrier substrate whose area is smaller than that of the second principal surface 3. The adhesive layer 6 and the antifouling layer 7 are formed under a state where the glass plate 5 is bonded on the carrier substrate whose area is smaller than the second principal surface 3. The adhesive layer forming material and the antifouling layer forming material thereby respectively go around the second principal surface 3 side during the processes of the sputtering and the deposition, adhere to the exposing uppermost surface which is not bonded to the carrier substrate on the second principal surface 3 side of the glass plate 5, and the adhesive layer 6 and the antifouling layer 7 are formed. The adhesive layer 6 and the antifouling layer 7 can be formed at the exposing region of the uppermost surface on the second principal surface 3 side which is not bonded to the carrier substrate, that is, the region up to near the outer periphery.

On the other hand, when the carrier substrate whose area is larger than the second principal surface 3 is used, it is possible to make the adhesive layer 6 and the antifouling layer 7 seldom go around the second principal surface 3 side. When the antifouling layer 7 is provided only on the surface of the adhesive layer 6 on the first principal surface 2 and on the end face 4, a size of the carrier substrate is preferably equal to or larger than a size of the second principal surface 3.

Figure 6:
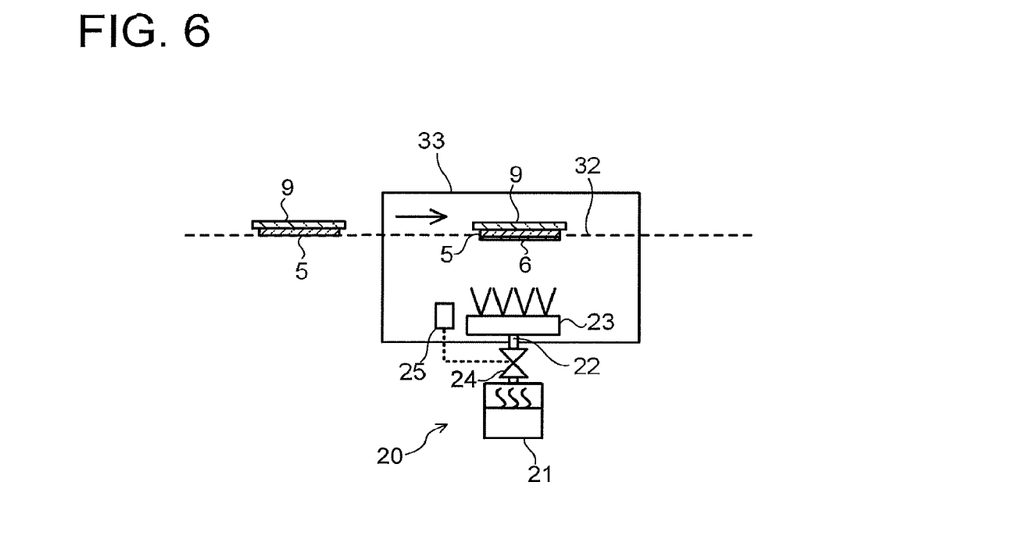
FIG. 6 is a view schematically illustrating an example of an apparatus to form an antifouling layer.

FIG. 6 is a view schematically illustrating an example of a usable apparatus to form the antifouling layer 7 in the manufacturing method of the glass plate 1 with the antifouling layer of this embodiment. The apparatus illustrated in FIG. 6 is an apparatus to deposit the film-forming composition containing the fluorine-containing hydrolyzable silicon compound on the surface of the adhesive layer 6 on the first principal surface 2 and on the end face 4 of the glass plate 5 where a carrier substrate 9 is bonded on the second principal surface 3.

When the apparatus illustrated in FIG. 6 is used, the glass plate 5 where the adhesive layer 6 is formed over the first principal surface 2 and the end face 4 becomes the glass plate 1 with the antifouling layer by forming the antifouling layer 7 in a vacuum chamber 33 while the glass plate 5 is conveyed from a left side toward a right side in the drawing by a conveying unit 32.

In the vacuum chamber 33 illustrated in FIG. 6, the film-forming composition is adhered to the surface of the adhesive layer 6 on the first principal surface 2 and on the end face 4 of the glass plate 5 by using a vacuum deposition apparatus 20 through the vacuum deposition method, in particular, a resistive heating method.

A pressure in the vacuum chamber 33 is preferably kept to be 1 Pa or less, more preferably 0.1 Pa or less from a viewpoint of production stability. The vacuum deposition by the resistive heating method can be performed without any problem if the pressure in the vacuum chamber 33 falls within the above-stated range.

The vacuum deposition apparatus 20 includes a heating container 21 to heat the film-forming composition, a pipe 22 to supply vapor of the film-forming composition from the heating container 21 into the vacuum chamber 33, and a manifold 23 connected to the pipe 22 and having an injection port to inject the vapor of the film-forming composition supplied from the heating container 21 to the first principal surface 2 of the glass plate 5 at an outside of the vacuum chamber 33. In the vacuum chamber 33, the glass plate 5 is held such that the injection port of the manifold 23 and the first principal surface 2 of the glass plate 5 face with each other.

The heating container 21 has a heating unit capable of heating the film-forming composition being a vapor deposition source to a temperature having a sufficient vapor pressure. Concretely, the heating temperature of the film-forming composition is preferably 30° C. or more and 400° C. or less, and particularly preferably 150° C. or more and 350° C. or less though it depends on kinds of the film-forming composition. When the heating temperature of the film-forming composition is a lower limit value or more in the above range, a film-forming rate becomes good. When the heating temperature of the film-forming composition is an upper limit value or less in the above range, the film having the antifouling properties can be formed on the surface of the adhesive layer 6 on the first principal surface 2 and on the end face 4 of the glass plate 5 without generating decomposition of the fluorine-containing hydrolyzable silicon compound.

Here, in the above-stated method, it is preferable to provide a pre-treatment to discharge the vapor of the film-forming composition outside the system for a predetermined time after the film-forming composition containing the fluorine-containing hydrolyzable silicon compound in the heating container 21 is heated to a vapor deposition start temperature at the vacuum deposition time. It is thereby possible to remove a low-molecular weight component or the like which is normally contained in the fluorine-containing hydrolyzable silicon compound and affects the durability of the obtained film, and further to stabilize a composition of raw material vapor supplied from the vapor deposition source to the manifold 23 owing to this pretreatment. It is thereby possible to stably form the fluorine-containing organosilicon compound film with high durability.

Concretely, a pipe (not-illustrated) which is connected to an openable and closable exhaust port to discharge initial vapor of the film-forming composition toward outside the system is provided at an upper part of the heating container 21 in addition to the pipe 22 which is connected to the manifold 23, and a method to trap the initial vapor at outside the system or the like may be taken.

A temperature of the glass plate 5 at the vacuum deposition time is preferably in a range from a room temperature (20° C. or more and 25° C. or less) to 200° C. When the temperature of the glass plate 5 is 200° C. or less, the film-forming rate becomes good. An upper limit value of the temperature of the glass plate 5 is more preferably 150° C., and particularly preferably 100° C.

The manifold 23 preferably includes a heater capable of heating the vapor in order to prevent the vapor supplied from the heating container 21 from condensing. The pipe 22 is preferably designed to be heated together with the heating container 21 in order to prevent the vapor from the heating container 21, from condensing in the middle of the pipe 22.

It is preferable to provide a variable valve 24 on the pipe 22, and an opening degree of the variable valve 24 is controlled based on a detected value by a thicknessmeter 25 provided inside the vacuum chamber 33 in order to control the film-forming rate. The configuration as above is provided, and thereby, it is possible to control an amount of vapor of the film-forming composition containing the fluorine-containing hydrolyzable silicon compound supplied to the surface of the adhesive layer 6 on the first principal surface 2 and on the end face 4 of the glass plate 5. It is thereby possible to accurately form a film with an objected thickness on the surface of the adhesive layer 6 on the first principal surface 2 of the glass plate 5. As the thicknessmeter 25, a quartz resonator monitor or the like can be used. Further, regarding a film thickness measurement, an interference pattern of reflected X-ray is obtained by an X-ray reflectivity method, and the film thickness can be calculated from a vibration period of the interference pattern when, for example, a thin film analysis X-ray diffractometer ATX-G (manufactured by RIGAKU Corporation) is used as the thicknessmeter 25.

The film-forming composition containing the fluorine-containing hydrolyzable silicon compound is thereby adhered to the surface of the adhesive layer 6 on the first principal surface 2 and on the end face 4 of the glass plate 5. Further, the fluorine-containing hydrolyzable silicon compound is chemically bonded to the adhesive layer 6 and siloxane bonding occurs between molecules by the hydrolysis and condensation reaction of the fluorine-containing hydrolyzable silicon compound which is occurred simultaneously with the adhesion, or after the adhesion, and thereby, the fluorine-containing organosilicon compound film is formed.

The hydrolysis and condensation reaction of the fluorine-containing hydrolyzable silicon compound proceeds at the surface of the adhesive layer 6 simultaneously with the adhesion to the adhesive layer 6, but the glass plate 5 where the fluorine-containing organosilicon compound film is formed may be subjected to heat treatment by using a hot plate or a thermohygrostat after it is taken out of the vacuum chamber 33 according to need so as to further sufficiently accelerate the hydrolysis and condensation reaction. As conditions of the heat treatment, there can be cited, for example, the heat treatment at a temperature of 80° C. or more and 200° C. or less for 10 minutes or more and 60 minutes or less.

The printed layer 8 is formed by a method printing ink. As a method of printing the ink, there are a bar coating method, a reverse coating method, a gravure coating method, a die coating method, a roll coating method, a screen printing method, and so on. Among them, the screen printing method is preferable because it is easy to print, printing on various base materials is possible, and the printing according to a size of the glass plate 5 is possible. The printed layer 8 may be formed of multiple layers where a plurality of layers are stacked, or may be formed of a single layer. When the printed layer 8 is formed of the multiple layers, the printed layer 8 is formed by repeating the above-stated printing of ink, and drying of the printed ink.

The ink is not particularly limited, and can be selected according to the color of the printed layer 8 to be formed. For example, there may be used either an inorganic ink containing a ceramic fired body or the like or an organic ink containing a color material such as dye or pigment and an organic resin.

For example, when the printed layer 8 is formed by black, there can be cited an oxide such as a chromium oxide, an iron oxide, a carbide such as a chromium carbide, a tungsten carbide, carbon black, mica, and so on as the ceramics contained in the black inorganic ink. The black printed layer 8 is obtained by kneading the inorganic ink made up of the ceramics and silica, printed in a desired pattern, and thereafter drying the ink. This inorganic ink requires melting and drying processes, and in general, it is used as glass dedicated ink.

The organic ink is a composition containing the dye or the pigment in a desired color and the organic resin. As the organic resin, there can be cited an epoxy-based resin, an acrylic-based resin, polyethylene terephthalate, polyethersulfone, polyarylate, polycarbonate, an acrylonitrile-butadiene-styrene (ABS) resin, a phenol resin, a transparent ABS resin, a homopolymer such as polyurethane, polymethyl methacrylate, polyvinyl, polyvinylbutyral, polyetheretherketone, polyethylene, polyester, polypropylene, polyamide, polyimide, and a resin made up of a copolymer of a monomer capable of copolymerized with a monomer of these resins.

Between the above-stated inorganic ink and organic ink, usage of the organic ink is preferable because a drying temperature thereof is low. Besides, the organic ink containing pigment is preferable from a viewpoint of chemical resistance.

The glass plate with the antifouling layer of the embodiment obtained as above is the glass plate excellent in the antifouling properties such as the water repellency and the oil repellency, and having high strength.

[Physical Properties of Glass Plate with Antifouling Layer]

(4-Point Flexural Strength)

A 4-point flexural strength of the glass plate 1 with the antifouling layer is preferably 400 MPa or more, and more preferably 500 MPa or more. The 4-point flexural strength falls within the above range, and thereby, the glass plate 1 with the antifouling layer has high strength suitable for the touch panel or the like. The 4-point flexural strength is a value measured based on a method defined by JIS R1601.

(Scratched 4-Point Flexural Strength)

A scratched 4-point flexural strength is to evaluate the flexural strength while intentionally generating microcracks which may be origin of cracks on an evaluation surface of the glass plate 1 with the antifouling layer. A size of the scratched 4-point flexural strength depends on the number of microcracks, a length and a depth of each microcrack.

The scratched 4-point flexural strength in the present application is a value measured as same as the above-stated 4-point flexural strength after a scratching process is performed as follows for the glass plate 1 with the antifouling layer, and measured regarding the glass plate 1 with the antifouling layer which cracks from the end face 4.

The scratching process is performed by applying a blade of a cutter (manufactured by Olfa) to the glass plate 5 along a direction in parallel to a thickness direction of the glass plate 5, a load of 50 g is applied to the cutter, and the cutter is moved under the state along the direction in parallel to the thickness direction of the glass plate 5 with respect to an entire thickness. When the scratched 4-point flexural strength is measured, the scratching process is performed at each of three positions dividing the end face 4 between supporting tools into quarters at an outside of the glass plate 1 with the antifouling layer. In this case, the number of microcracks given by the scratching process is constant to be three, and it can be thought that the scratched 4-point flexural strength in this application depends on the length and the depth of each microcrack. That is, it can be thought that when the scratched 4-point flexural strength is the same degree as the 4-point flexural strength, it is suggested that the number of the long and/or the deep microcracks causing cracks is small or the microcrack does not exist.

In the glass plate 1 with the antifouling layer, the scratched 4-point flexural strength is also preferably 400 MPa or more, and more preferably 500 MPa or more. The scratched 4-point flexural strength falls within the above-stated range, and thereby, the occurrence of microcracks, especially the occurrence of microcracks in the assembling process to the portable equipment or the like can be suppressed, and breakage or the like of the glass plate 1 with the antifouling layer can be avoided. Here, it is also possible to strengthen the end face 4 by precisely performing chamfering while adjusting conditions thereof, but in this case, there is a possibility that the number of processes increases to lower productivity. On the other hand, according to the glass plate 1 with the antifouling layer, since the adhesive layer 6 and the antifouling layer 7 are simultaneously and respectively formed at the first principal surface 2 and the end face 4, the high strength glass plate 1 with the antifouling layer can be efficiently manufactured. The 4-point flexural strength and the scratched 4-point flexural strength of the glass plate 10 with the antifouling layer are the same as those of the glass plate 1 with the antifouling layer.

(Water Contact Angle)

A contact angle of the glass plate 1 with the antifouling layer is preferably 90° or more and 130° or less, and more preferably 100° or more and 120° or less. The contact angle falls within the above range, and thereby, the glass plate 1 with the antifouling layer exhibits excellent antifouling properties. Note that the contact angle is a value of a contact angle with respect to water, and for example, water droplets of pure water of approximately 1 are dropped on an uppermost surface on the first principal surface 2 side of the glass plate 1 with the antifouling layer, and the contact angle can be measured by a contact angle meter (refer to JIS R 3257). A contact angle of the glass plate 10 with the antifouling layer is also the same as above.

According to the glass plate with the antifouling layer of this invention, the antifouling properties such as the water repellency and the oil repellency are excellent, high strength is enabled by suppressing occurrence of microcracks which can be an origin of cracks especially at the end face, further, good post-processability can be obtained.

EXAMPLES

Next, examples of the present invention are described. The present invention is not limited to the following examples. Examples 1 to 5 are the examples of the present invention, and Examples 6 to 8 are comparative examples.

A plate-shaped glass (Dragontrail (registered trademark), manufactured by Asahi Glass Co., Ltd) with a thickness of 1.3 mm, having opposed square principal surfaces was used as a glass plate, and a glass plate with an antifouling layer was obtained according to the following procedure of each example. Hereinafter, one principal surface is called a first surface, the other principal surface is called a second surface, and a surface in a thickness direction is called an end face of the glass plate.

Example 1

The glass plate was subjected to (1) antiglare treatment, (2) chamfering, (3) chemical tempering and alkali treatment, (4) formation of a black printed layer, (5-1) formation of an adhesive layer (6) film-formation of an antifouling layer in this order according to the following procedure.

(1) Antiglare Treatment

The first surface of the glass plate is subjected to the antiglare treatment through frost treatment according to the following procedure.

First, an acid-resistant protective film (hereinafter, it is referred to just as a "protective film") was bonded to the principal surface (second surface) of the glass plate on a side where the antiglare treatment was not performed. Next, the glass plate was immersed into a 3 mass % hydrogen fluoride solution for three minutes to etch the glass plate, to thereby remove fouling adhered on a surface of the first surface. Next, the glass plate was immersed into a mixed solution of 15 mass % hydrogen fluoride and 15 mass % potassium fluoride for three minutes, and the first surface of the glass plate was subjected to the frost treatment. The glass plate was then immersed into a 10 mass % hydrogen fluoride solution for six minutes, to thereby adjust the haze value at the first surface which was subjected to the antiglare treatment to be 25%. Note that the haze value was measured by using a haze meter (product name: HZ-V3, manufactured by Suga Test Instruments Co., Ltd.) based on JIS K 7136.

(2) Chamfering

The glass plate being subjected to the antiglare treatment was cut into a size of 150 mm×250 mm. Subsequently, C chamfering of 0.2 mm was performed for a whole periphery of the glass plate. Chamfering was performed with a grindstone No. 600 (manufactured by Tokyo Diamond Tools Mfg. Co., Ltd.), the number of rotations of the grindstone was 6500 rpm, and a moving speed of the grindstone was 5000 mm/min.

(3) Chemical Tempering and Alkali Treatment

The protective film bonded to the glass plate was removed, then the glass plate was immersed into potassium nitrate salt which was heated to 450° C. to be melted for two hours. After that, the glass plate was pulled up from the molten salt, slowly cooled to the room temperature in one hour, to thereby perform the chemical tempering. The chemically tempered glass plate with a surface compressive stress (CS) of 730 MPa, and a depth of a stress layer (DOL) of 30 μm was thereby obtained. Further, this glass plate was immersed into an alkaline solution (Sunwash TL-75, manufactured by Lion Corporation) for four hours to perform the alkali treatment.

(4) Formation of Black Printed Layer

Printing was performed in a black frame state with a width of 2 cm on all sides of an outside peripheral part of the second surface of the glass plate, to form the black printed layer. First, after a black ink (product name: GLSHF, manufactured by Teikoku Printing Inks Mfg. Co., Ltd.) was coated with a thickness of 5 μm by a screen printer, it was held at 150° C. for 10 minutes to be dried, to form a first printed layer. Next, after the black ink was coated with a thickness of 5 μm on the first printed layer according to the same procedure, it was held at 150° C. for 40 minutes to be dried, to form a second printed layer. The black printed layer where the first printed layer and the second printed layer were stacked was thereby formed, and the glass plate including the black printed layer at the outside peripheral part of the second surface was obtained.

(5-1) Formation of Adhesive Layer

Next, a silicon oxide film was formed on the first surface and the end face of the glass plate according to the following method.

First, a glass plate (carrier substrate) with a thickness of 2 mm, and a size of 1000 mm×1000 mm was bonded to an uppermost surface on the second surface side where the black printed layer was formed of the glass plate by using a polyimide double-sided adhesive tape (product name: 760H, manufactured by Teraoka Seisakusho Co., Ltd.).

Next, the pulse sputtering was performed under conditions of a pressure of 0.3 Pa, a frequency of 20 kHz, a power density of 3.8 W/cm$^2$, a reverse pulse width of 5 μsec by using a silicon target (manufactured by AGC Ceramics Co., Ltd.) while introducing mixed gas where oxygen gas was mixed to be 40 volume % to argon gas in a vacuum chamber to form an adhesive layer formed of a silicon oxide ($SiO_2$) with a thickness on the first surface of 20 nm on the first surface and the end face of the glass plate.

(6) Film-Formation of Antifouling Layer (AFP)

An apparatus similar to the apparatus illustrated in FIG. 6 was used, and the antifouling layer was film-formed according to the following method. The glass plate was used while the carrier substrate was bonded thereto, and the antifouling layer was simultaneously and efficiently film-formed by the vacuum deposition method on a surface of the adhesive layer on the first surface and the end face. First, a forming composition of the fluorine-containing organosilicon compound film (KY-185, manufactured by Shin-Etsu Chemical Co., Ltd.) was introduced into a heating container as a material of the antifouling layer. After that, deaeration in the heating container was performed for 10 hours or more by a vacuum pump to remove solvent in the forming material, to obtain the forming composition of the fluorine-containing organosilicon compound film (hereafter, referred to as an antifouling layer forming composition) in the heating container.

Next, the heating container accommodating the antifouling layer forming composition was heated to 270° C. After a container temperature reached 270° C., the state was kept for 10 minutes until the temperature was stabilized. Next, the glass plate bonded to the carrier substrate was placed in the vacuum chamber. After that, the antifouling layer forming composition was supplied from a nozzle connected to the heating container accommodating the antifouling layer forming composition toward an uppermost surface on the first surface side of the glass plate to perform the film-forming.

The film-forming was performed while measuring a film thickness by a quartz resonator monitor placed in the vacuum chamber, and continued until the film thickness of the antifouling layer became 4 nm. Next, the glass plate taken out of the vacuum chamber was placed on a hot plate such that the fluorine-containing organosilicon compound film surface faced upward, and heat treatment was performed in the atmosphere at 150° C. for 60 minutes.

The glass plate with the antifouling layer having the similar constitution as the glass plate with the antifouling layer illustrated in FIG. 2 and FIG. 3, including the adhesive layer formed of the silicon oxide film and the antifouling layer on the first surface and on the end face of the glass plate was thereby obtained as described above.

Example 2

The glass plate was subjected to (1) antiglare treatment, (2) chamfering, (3) chemical tempering and alkali treatment, (4) formation of the black printed layer, as same as Example 1. Next, after (5-2) formation of an adhesive layer (low-reflection film) was performed as described below, (6) formation of an antifouling layer was performed on an uppermost surface layer of the low-reflection film as same as Example 1.

(5-2) Formation of Adhesive Layer (Low-Reflection Film)

First, the uppermost surface of the glass plate on the second surface side where the black printed layer was formed was bonded to the carrier substrate as same as Example 1.

Next, a high-refractive-index layer was formed on an uppermost surface of the first surface of the glass plate which was subjected to the antiglare treatment, as described below. In a vacuum chamber, the pulse sputtering was performed under the conditions of the pressure of 0.3 Pa, the frequency of 20 kHz, the power density of 3.8 W/cm$^2$, and the reverse pulse width of 5 μsec by using a niobium oxide target (product name: NBO target, manufactured by AGC Ceramics Co., Ltd.) while introducing mixed gas where oxygen gas was mixed to be 10 volume % to argon gas, to thereby form a first high-refractive-index layer formed of a niobium oxide (niobia) with a thickness on the first surface of the glass plate of 13 nm on the first surface and the end surface of the glass plate.

Next, the pulse sputtering was performed under the conditions of the pressure of 0.3 Pa, the frequency of 20 kHz, the power density of 3.8 W/cm$^2$, and the reverse pulse width of 5 μsec by using a silicon target while introducing mixed gas where oxygen gas was mixed to be 40 volume % to argon gas, to thereby form a first low-refractive-index layer formed of a silicon oxide (silica) with a thickness on the first surface of the glass plate of 35 nm on the high-refractive-index layer.

Next, a second high-refractive-index layer formed of the niobium oxide (niobia) with a thickness on the first surface of the glass plate of 115 nm was formed on the first low-refractive-index layer as same as the first high-refractive-index layer. Further, a second low-refractive-index layer formed of the silicon oxide (silica) with a thickness on the first surface of the glass plate of 80 nm was formed on the second high-refractive-index layer as same as the first low-refractive-index layer.

A low-reflection film where the niobium oxides (niobia) and the silicon oxides (silica) are alternately stacked for total four layers was formed as described above. The low-reflection film functions as the adhesive layer in the obtained glass plate with the antifouling layer.

Example 3

The glass plate with the antifouling layer was obtained as same as Example 2 except that (1) the antiglare treatment was not performed, and the forming material in (6) the antifouling layer in Example 2 was changed into OPTOOL (registered trademark) DSX (product name, manufactured by DAIKIN Industries, Ltd.).

Example 4

The glass plate with the antifouling layer was obtained as same as Example 2 except that (4) formation of the black printed layer in Example 2 was not performed.

Example 5

The glass plate with the antifouling layer was obtained as same as Example 2 except that a constitution of (5-2) the adhesive layer (low-reflection film) in Example 2 was changed as described below. In Example 5, the low-reflection film was formed by alternately stacking the high-refractive-index layers each formed of a silicon nitride (SiN) and the low-refractive-index layers each formed of the silicon oxide for four layers, respectively. The high-refractive-index layer formed of the silicon nitride was formed by performing the pulse sputtering in the vacuum chamber under the conditions of the pressure of 0.3 Pa, the frequency of 20 kHz, the power density of 3.8 W/cm$^2$, and the reverse pulse width of 5 μsec by using a silicon target while introducing mixed gas where nitrogen gas was mixed to be 50 volume % to argon gas. Thicknesses of respective layers constituting the low-reflection film are as follows from the layer near the glass plate: the first high-refractive-index layer is 15 nm; the first low-refractive-index layer is 70 nm; the second high-refractive-index layer is 17 nm; the second low-refractive-index layer is 105 nm; the third high-refractive-index layer is 15 nm; the third low-refractive-index layer is 50 nm; the fourth high-refractive-index layer is 120 nm; and the fourth low-refractive-index layer is 80 nm.

Example 6

The glass plate where the antifouling layer was formed on the uppermost surface of the first surface was obtained as same as Example 1 except that (5-1) formation of the adhesive layer in Example 1 was not performed.

Example 7

The glass plate was subjected to the same processes as Example 1 except that (5-1) formation of the adhesive layer and (6) film-formation of the antifouling layer in Example 1 were not performed.

Example 8

The glass plate where the adhesive layer was formed on the uppermost surface of the first surface was obtained as same as Example 1 except that (6) film-formation of the antifouling layer in Example 1 was not performed.

[Evaluation]

The 4-point flexural strength, the scratched 4-point flexural strength, luminous reflectance, the water contact angle, and detection of peak arising from 1 s orbit of fluorine through an X-ray photoelectron spectroscopy (XPS) were respectively performed according to methods described below with respect to the glass plates each with the antifouling layer obtained by Examples 1 to 5, and the glass plates obtained by Examples 6 to 8.

(4-Point Flexural Strength)

An average 4-point flexural strength was measured based on the method defined by JIS R1601. The glass plate with the antifouling layer or the glass plate was placed on two supporting tools disposed with an interval of an outer width of 80 mm, an inner width of 40 mm, a load is divided to be applied to 2 points existing at the same distance in left and right from a center between two fulcrums where the glass plate with the antifouling layer or the glass plate was placed, and a maximum flexural stress was measured when the glass plate with the antifouling layer or the glass plate was cracked. The maximum flexural stress when the glass plate with the antifouling layer or the glass plate was cracked was calculated by using a calculation formula of 4-point flexure defined by the JIS standards. An origin of cracks was checked after the glass plate with the antifouling layer or the glass plate was cracked, and the glass plate which was cracked from an end face part between the two supporting tools was set as an evaluation object.

(Scratched 4-Point Flexural Strength)

In the 4-point flexural strength, after the following scratching processes were performed for the opposed two end faces on a side perpendicular to a surface facing the two supporting tools of the glass plate with the antifouling layer or the glass plate, the 4-point flexural test was performed similarly to the above. A blade of a cutter (made by Olfa) was applied to the end face of the glass plate with the antifouling layer or the glass plate along a direction in parallel to a thickness direction, and a load of 50 g was applied to the cutter. The cutter was moved under this state with respect to a whole thickness along the direction in parallel to the thickness direction of the end face of the glass plate with the antifouling layer or the glass plate. The scratching processes were performed according to the above method at three positions each located at positions dividing the end face between the two supporting tools of the glass plate with the antifouling layer or the glass plate into quarters, and then, the 4-point flexural test was performed.

(Water Contact Angle)

Water droplets of pure water of approximately 1 μL were dropped on the uppermost surface on the first surface side of the glass plate with the antifouling layer or the glass plate, and a contact angle with respect to the water was measured by a contact angle meter (model: DM-51, manufactured by Kyowa Interface Science Co., Ltd.).

(Luminous Reflectance)

Spectral reflectance was measured by a spectrophotometric colorimeter (model: CM-2600d, manufactured by Konica Minoruta, Inc.) in an SCI mode regarding a region of the uppermost surface on the first surface side of the glass plate with the antifouling layer or the glass plate opposite to the black printed layer formed on the second surface, and luminous reflectance (a stimulus value Y of reflection defined by JIS Z8701) was found from the spectral reflectance. The spectral reflectance of Example 4 was found as same as Example 1.

(Detection of Peak Arising from 1 s Orbit of Fluorine Through XPS)

Presence/absence of detection of peak arising from the is orbit of fluorine (F) at the end face of the glass plate with the antifouling layer or the glass plate was measured by using an X-ray photoelectron spectroscopy (model: Quantera SXM, manufactured by ULVAC-PHI, Inc.). Since the fluorine is contained in the fluorine-containing hydrolyzable silicon compound, the detection of the peak arising from the is orbit of fluorine indicates that the antifouling layer is formed at the detected part.

Contents of each process and evaluation results with respect to the glass plates in Examples 1 to 8 are illustrated in Table 1. In Table 1, each of fields of the antiglare treatment and the chemical tempering was represented by a circle (○) when the process was performed, and a cross (x) when the process was not performed. A field of the printed layer was represented by a circle (○) when the printed layer was formed, and a cross (x) when the printed layer was not formed.

TABLE 1

|  |  | Example 1 | Example 2 | Example 3 | Example 4 | Example 5 | Example 6 | Example 7 | Example 8 |
|---|---|---|---|---|---|---|---|---|---|
| Glass plate | Thickness [mm] | 1.3 | 1.3 | 1.3 | 1.3 | 1.3 | 1.3 | 1.3 | 1.3 |
|  | Antiglare treatment | ○ | ○ | x | ○ | ○ | ○ | ○ | ○ |
|  | Chemical tempering | ○ | ○ | ○ | ○ | ○ | ○ | ○ | ○ |
|  | Printed layer | ○ | ○ | ○ | x | ○ | ○ | ○ | ○ |
| Low-reflection film (adhesive layer) | Material thickness | $SiO_2$ 20 nm | NbO 13 nm $SiO_2$ 35 nm NbO | NbO 13 nm $SiO_2$ 35 nm NbO | NbO 13 nm $SiO_2$ 35 nm NbO | SiN 15 nm $SiO_2$ 70 nm SiN | Absent | Absent | NbO 13 nm $SiO_2$ 35 nm NbO |

TABLE 1-continued

|  |  | Example 1 | Example 2 | Example 3 | Example 4 | Example 5 | Example 6 | Example 7 | Example 8 |
|---|---|---|---|---|---|---|---|---|---|
|  |  |  | 115 nm $SiO_2$ 80 nm | 115 nm $SiO_2$ 80 nm | 115 nm $SiO_2$ 80 nm | 17 nm $SiO_2$ 105 nm SiN 15 nm $SiO_2$ 50 nm SiN 120 nm $SiO_2$ 80 nm |  |  | 115 nm $SiO_2$ 85 nm |
|  | Antifouling layer Material (product name) | KY-185 | KY-185 | OPTOOL DSX | KY-185 | KY-185 | KY-185 | Absent | Absent |
|  | Material (manufacturer) | Shin-Etsu Chemical | Shin-Etsu Chemical | DAIKIN | Shin-Etsu Chemical | Shin-Etsu Chemical | Shin-Etsu Chemical |  |  |
|  | Thickness [nm] | 4 | 4 | 4 | 4 | 4 | 4 |  |  |
| Evaluation | 4-point flexural strength [MPa] | 680 | 620 | 620 | 640 | 600 | 700 | 680 | 620 |
|  | Scratched 4-point flexural strength [MPa] | 640 | 600 | 610 | 620 | 530 | 310 | 290 | 300 |
|  | Luminous reflectance (on surface opposite to black printed layer) [%] | 4.2% | 1.0% | 0.8% | 0.8% | 1.5% | 4.2% | 4.2% | 0.8% |
|  | Water contact angle [°] | 113 | 112 | 116 | 114 | 110 | 113 | 15 | 30 |
|  | Detection of peak arising from 1s orbit of F through XPS | Detectable | Detectable | Detectable | Detectable | Detectable | Detectable | Un-Detectable | Un-Detectable |

As illustrated in Table 1, each of the glass plates each with the antifouling layer of the examples (Examples 1 to 5) includes the antifouling layer on the first surface side, and the peak arising from the is orbit of F through the XPS was detected at the end face, and the end face is confirmed to include the antifouling layer. That is, it is clear that the adhesive layer (low-reflection film) and the antifouling layer are included from the first surface to the end face of the glass plate in the glass plate with the antifouling layer of each example.

Whereas the scratched 4-point flexural strength keeps 80% or more of the 4-point flexural strength in the glass plate with the antifouling layer of each example, the scratched 4-point flexural strength is lowered to less than 50% of the 4-point flexural strength in the glass plate of each comparative example (Examples 6 to 8). It can be thought from the above that occurrences of long microcracks and deep microcracks which can be crack origins are at least suppressed at the end face in the glass plate with the antifouling layer of each example.

In Example 6, it can be thought that the microcracks given by the scratching process are longer and/or deeper to lower the scratched 4-point flexural strength because the antifouling layer was formed but the adhesive layer was not formed. Namely, it is clear that the adhesive layer is necessary not to lower the scratched 4-point flexural strength.

It can be seen that each of the glass plates each with the antifouling layer of the examples has a large water contact angle and exhibits excellent antifouling properties compared to each of the glass plates of Examples 7, 8 where the antifouling layer is not formed.

What is claimed is:

1. A glass plate with an antifouling layer, comprising:
a glass plate having a first principal surface, a second principal surface opposite to the first principal surface, and an end face connecting the first principal surface and the second principal surface;
a printed layer formed on a periphery of the second principal surface of the glass plate;
an adhesive layer formed on the first principal surface of the glass plate, the end face of the glass plate, and the printed layer, where the adhesive layer is a low-reflection film having an uppermost layer comprising silicon oxide; and
an antifouling layer formed on the adhesive layer,
wherein the adhesive layer and the antifouling layer are formed on the printed layer such that the adhesive layer and the antifouling layer exist outside an inner periphery of the printed layer and inside an outer periphery of the printed layer.

2. The glass plate with the antifouling layer according to claim 1, wherein
the printed layer is continuously formed on the periphery of the second principal surface of the glass plate.

3. The glass plate with the antifouling layer according to claim 1, wherein
the adhesive layer and the antifouling layer are formed on the printed layer such that the antifouling layer forms an outermost surface on a side of the second principal surface of the glass plate.

4. The glass plate with the antifouling layer according to claim 1, wherein
the antifouling layer comprises a fluorine-containing organic group.

5. The glass plate with the antifouling layer according to claim 1, wherein
the antifouling layer is formed of a cured matter of a film-forming composition comprising a fluorine-containing hydrolyzable silicon compound.

6. The glass plate with the antifouling layer according to claim 1, wherein
the glass plate is a chemically tempered glass plate.

7. The glass plate with the antifouling layer according to claim 1, wherein
the first principal surface of the glass plate has a projecting and recessed shape.

8. The glass plate with the antifouling layer according to claim 7, wherein
the first principal surface of the glass plate has the projecting and recessed shape such that the glass plate has antiglare property.

9. The glass plate with the antifouling layer according to claim 1, wherein each of the adhesive layer and the antifouling layer is uniformly formed on the first principal surface of the glass plate.

10. The glass plate with the antifouling layer according to claim 1, wherein
the low-reflection film comprises alternately laminated high-refractive-index layers having refractive index at a wavelength of 550 nm of 1.9 or more and low-refractive-index layers having refractive index at a wavelength of 550 nm of 1.6 or less.

11. The glass plate with the antifouling layer according to claim 10, wherein
the high-refractive-index layers comprise at least one selected from the group consisting of niobium oxide ($Nb_2O_5$) titanium oxide ($TiO_2$), zirconium oxide ($ZrO_2$), tantalum oxide ($Ta_2O_5$), and silicon nitride (SiN), and
the low-refractive-index layers comprise at least one selected from the group consisting of silicon oxide ($SiO_2$), a material containing a mixed oxide of Si and Sn, a material containing a mixed oxide of Si and Zr, and a material containing a mixed oxide of Si and Al.

12. The glass plate with the antifouling layer according to claim 8, wherein
the first principal surface of the glass plate has a surface roughness RMS of 0.01 μm or more and 0.5 μm or less.

13. The glass plate with the antifouling layer according to claim 1, wherein
the glass plate has a thickness of 0.5 mm or more and 3 mm or less.

14. The glass plate with the antifouling layer according to claim 8, wherein
the projecting and recessed shape is formed by frost treatment.

15. The glass plate with the antifouling layer according to claim 4, wherein
the antifouling layer has a thickness of 2 nm or more and 20 nm or less.

16. The glass plate with the antifouling layer according to claim 4, wherein
the fluorine-containing organic group is at least one selected from the group consisting of a perfluoropolyether group, a perfluoroalkylene group, and a perfluoroalkyl group.

17. A display device, comprising:
the glass plate with the antifouling layer according to claim 1.

18. The display device according to claim 17, wherein
the glass plate with the antifouling layer is disposed on a display part of the display device such that the second principal surface of the glass plate faces the display part.

19. The display device according to claim 18, wherein
the glass plate with the antifouling layer is bonded to the display part of the display device by an adhesive material, and
the adhesive material is disposed on the printed layer.

20. A display device, comprising:
the glass plate with the antifouling layer according to claim 2.

* * * * *